No. 827,710. PATENTED AUG. 7, 1906.
G. J. CONATY.
ELECTRIC TRAM CAR.
APPLICATION FILED OCT. 17, 1904.
3 SHEETS—SHEET 2.
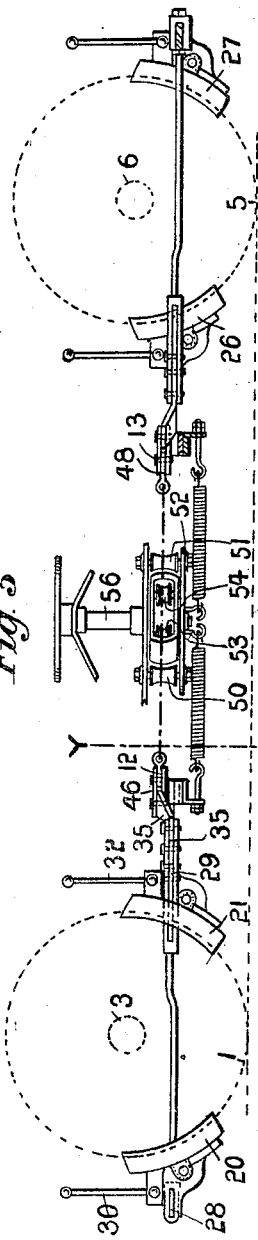
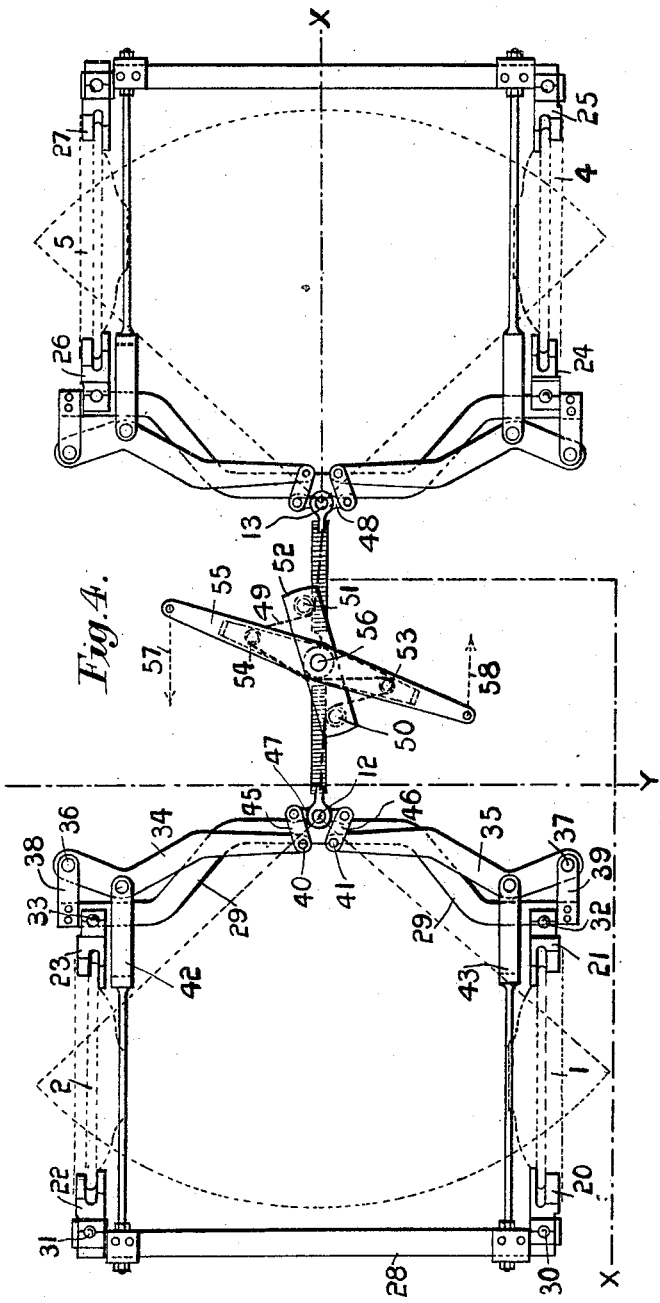
Witnesses.
Inventor.
George John Conaty

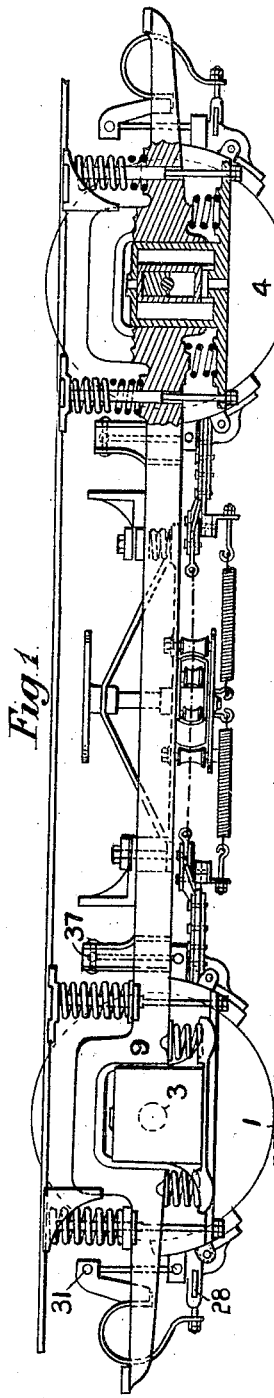

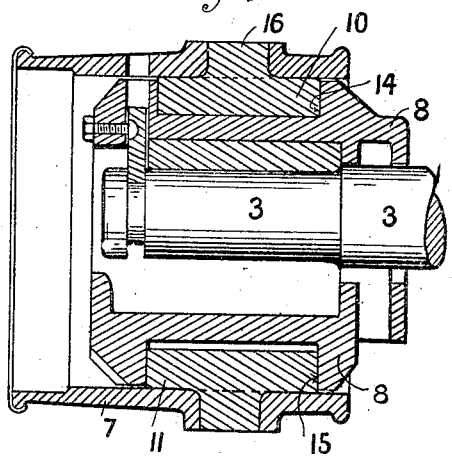
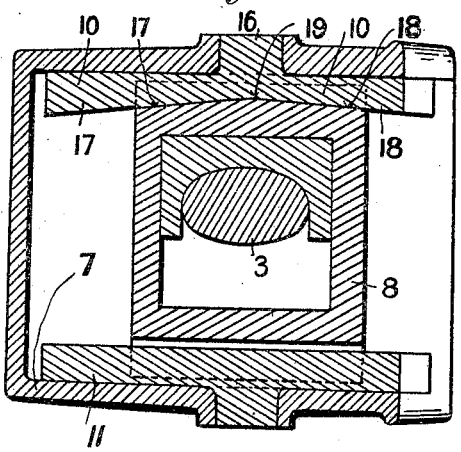
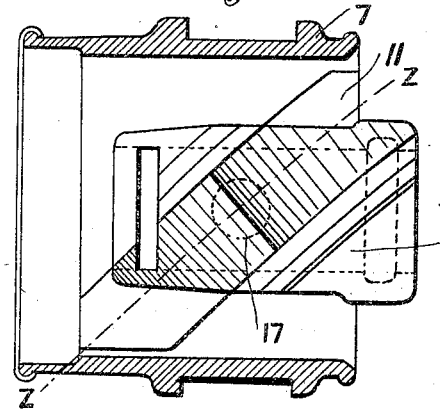
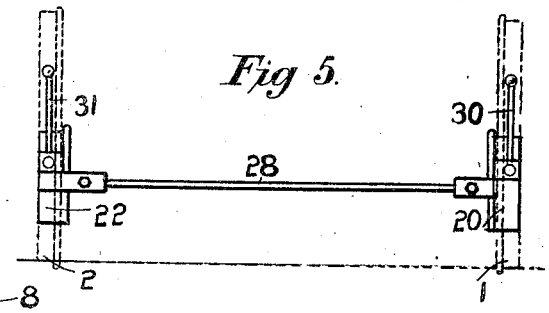
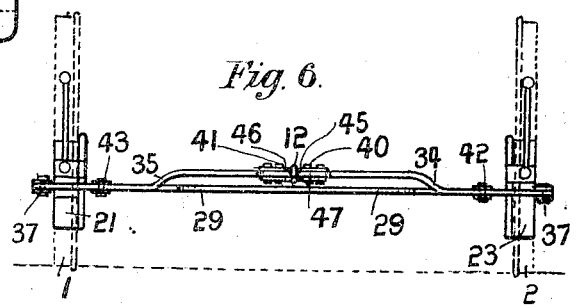

UNITED STATES PATENT OFFICE.

GEORGE JOHN CONATY, OF SMETHWICK, ENGLAND.

ELECTRIC TRAM-CAR.

No. 827,710.    Specification of Letters Patent.    Patented Aug. 7, 1906.

Application filed October 17, 1904. Serial No. 228,820.

*To all whom it may concern:*

Be it known that I, GEORGE JOHN CONATY, tramway company's manager, a subject of His Majesty the King of Great Britain and Ireland, and a resident of 33 Bearwood road, Smethwick, in the county of Stafford, England, have invented new and useful Improvements in and Connected with Electric Tram-Cars, of which the following is a specification.

This invention has reference to electric tram-cars which run on four wheels and of which the two axles of the car each have a movement radial to the track or curve, the electric motors which drive the axles having the same radial movement as the axles, so as to drive equally well in whatever position the axles may be.

This invention consists of the herein-described improvements whereby the axles after having moved radially in passing round the track or curve are quickly brought back to their normal positions relatively to the car; and my invention further consists of improvements in the brake mechanism whereby the construction is simplified and equal pressures are exerted on all the eight brake-blocks of the four wheels at the same time no matter in what positions the wheel-axles may be, the brake mechanism being unaffected by the turning of the car or axles.

I will describe my invention by referring to the accompanying drawings, on which—

Figure 1 is a side elevation of the four-wheel truck of an electric tram-car with my invention applied. Fig. 2 is a plan of the same, partly in section. Fig. 3 is a side elevation of the brake mechanism of the same, partly in section, on line X X of Fig. 4. Fig. 4 is a plan of the said brake mechanism. Fig. 5 is an end elevation of the brake mechanism looking toward the left-hand side of Figs. 1, 2, 3, and 4. Fig. 6 is a cross-sectional elevation of the said brake mechanism on line Y Y of Figs. 3 and 4. Fig. 7 is a longitudinal sectional elevation of one of the axle-boxes of the said truck. Fig. 8 is a sectional plan of the same, and Fig. 9 is a cross-sectional elevation of the same on line Z Z of Fig. 8.

The same reference-numerals indicate the same or corresponding parts in all the figures.

One of the axles, which has the two wheels 1 2, is marked 3, and the other axle, which has the two wheels 4 5, is marked 6. It is old to give the axles radial movement in relation to the track or curve; but according to this present invention the axle-boxes have special means, as herein described, for quickly bringing the axles back to their normal positions relatively to the car after they have moved radially in passing round a curved track. For simplicity I will describe one of the axle-boxes of the axle 3; but it is to be understood that all four axle-boxes are of the same construction. It will be seen that the axle-box consists of an outer box 7 and an inner box 8 and that the outer box 7 is guided for vertical movement in the usual way in the guides in the side frame 9 of the truck and forms a support for the inner box 8, in which the axle 3 revolves, and this inner box 8 has a vertical movement with the outer box 7, but is also so arranged as to slide along curved guides 10 11 in the top and bottom of the outer box 7, and these guides 10 11 form arcs of a circle of which the center 12 is the center of the radial area of the axle 3. The center of the radial area of the other axle 6 is marked 13. These guides 10 11, together with the corresponding guides in the axle-box of the other end of the axle 3, thus allow the axle having the said radial movement relatively to the track or curve. The outer box 7 is made considerably wider than the inner box 8 so as to permit of the aforesaid radial movement, and the curved guides 10 11 are made of ribs engaging with corresponding grooves 14 15 in the top and bottom of the inner box 8. These guides 10 11 are, by preference, not rigidly formed with the outer axle-box 7, but each guide has a pivot 16, which takes into a corresponding vertical hole in the outer box 7, so that the guides can swivel slightly, if necessary.

In order to quickly bring the axles 3 6 back to their normal position after they have passed round a curve, the top guide 10 in each of the four axle-boxes is made with its under surface to incline upwardly at 17 18 toward the center 19, and the top of the inner box 8 is shaped to suit, (see Fig. 9,) so that after the axles 3 6 and their inner axle-boxes 8 have been turned about the centers 12 13 of the radial areas from their normal positions, as when passing round a curve, the swiveling-blocks 10, working along the inclines 17 or 18, have raised the body of the car slightly, so that directly the car runs onto the straight track again the weight of the car acting on the inclines causes the inner axle-box 8 to ride along the inclines 17 or 18 to the central position, (shown in Fig. 9,) thus preventing the body of the car remaining askew with the axles or returning to its proper central position very slowly, as is the case when the under side of the swivel-blocks 10 and the corresponding upper surfaces of the axle-box 8 are made flat or when no other special means are provided for bringing the axles back to their normal positions square with the body of the car.

My improved arrangement of brake mechanism is as follows: For simplicity I will describe one set of the brake mechanism—that is, for the two wheels 1 2 on the axle 3; but it is to be understood that the other set of brake mechanism, which is applied to the other two wheels 4 5 on the other axle 6, is similar, and the two sets of brake mechanism are so connected together that the eight brake-blocks 20 21 22 23 24 25 26 27 operate on the four wheels 1 2 4 5 of the car simultaneously. The four brake-blocks 20 21 22 23 are carried by two cross-beams 28 29, which are suspended by universal links 30 31 32 33 from the framework of the truck. The cross-beam 29 nearer to the center of the car carries two levers, (marked, respectively, 34 35,) the outer ends of which turn on fulcrum-pins 36 37, fixed to the cranked end parts 38 39 of the cross-beam 29, the power ends 40 41 of the levers 34 35 pointing in opposite directions toward the center line of the car. Jointed to these levers 34 35 at a short distance from their fulcra 36 37 are two links, (marked, respectively, 42 43,) which are connected to the beam 44 at the other side of the wheels 1 2. The power ends 40 41 of the two levers 34 35 are connected near the center line of the car by two pairs of links 45 46 to the ends of a balancing-beam 47, the center 12 of which is the center of the radial area in which the two wheels 1 2 and their axle 3 and the brake-gear and the electric motor turn. The balancing-beam of the other said brake-gear for the two wheels 4 5 is marked 48, and the center 13 of this balancing-beam 48 is the center of the radial area of the axle 6. The centers 12 13 of the balancing-beams 46 48 are by the chain 49 connected together. This chain 49 passes round rollers 50 51, fixed on the stationary framing 52, and also round the rollers 53 54, which are fixed on the cross-lever 55 at a short distance apart, this lever 55 being mounted on the spindle 56 at the center of the car. From the ends of this cross-lever 55 there are chains 57 58 or other suitable connections leading to the hand-levers or the like, by which the brakes are applied, so that when the cross-lever 55 is turned in the direction of the arrows in Fig. 4 the chain 49 will be pulled in opposite directions toward the center of the car and will thus apply the two sets of brakes with the eight brake-blocks 20 21 22 23 24 25 26 27 simultaneously and with equal force, and as the pull is always from the centers 12 13 of the radial areas the turning of the axles 3 6 makes no difference to the braking effect. The brakes are applied by turning the central spindle 56, so as to pull, as aforesaid, the chain 49, connecting together the two balancing-beams 47 48, bringing them nearer together, as aforesaid, and the links 45 46, connecting the ends of the balancing-beams 47 48 to the power ends 40 41 of the power-levers 34 35, and thus bringing the two beams 28 29, with their blocks 20 21 22 23 24 25 26 27, nearer together, so as to grip the two wheels 1 2 between them, and thus apply all the eight brake-blocks 20 21 22 23 24 25 26 27 to their respective wheels simultaneously. It will be understood that the brake-gear for the two wheels 4 5 is constructed similarly to that above described for the wheels 1 2 and that these two sets of brake-gear act simultaneously.

What I claim as my invention, and desire to secure by Letters Patent, is—

A four-wheel tram car or truck having two axles, bearings for said axles, said bearings permitting movement of each axle radial to the track or curve, two inner bearing-boxes for each axle and in which the ends of the axle revolve, outer boxes having vertical movement and radial guides in said outer boxes in which the inner boxes are adapted to move endwise with the axles, said guides having inclined bearing-faces above the inner bearing-boxes so that when the axles are moved out of their right-angular positions relatively to the longitudinal center line of the body of the car the weight of the body of the car acting through the inclines tends to bring the axles back to their normal positions square with the longitudinal center line of the body of the car.

In testimony whereof I have signed my name to this specification in the presence of two subscribing witnesses.

GEORGE JOHN CONATY.

Witnesses:
CHARLES BOSWORTH KETLEY,
THOMAS JOHN ROWE.